United States Patent
Hatstat et al.

(10) Patent No.: US 10,809,357 B2
(45) Date of Patent: Oct. 20, 2020

(54) DETERMINING OBJECT ATTRIBUTES USING PHOTOELECTRIC SENSORS

(71) Applicant: Datalogic USA, Inc., Eugene, OR (US)

(72) Inventors: Andrew Hatstat, Lansdale, PA (US); Bradley Gruss, Harleysville, PA (US)

(73) Assignee: Datalogic USA, Inc., Eugene, OR (US)

(*) Notice: Subject to any disclaimer, the term of this patent is extended or adjusted under 35 U.S.C. 154(b) by 370 days.

(21) Appl. No.: 15/723,420

(22) Filed: Oct. 3, 2017

(65) Prior Publication Data
US 2019/0101624 A1 Apr. 4, 2019

(51) Int. Cl.
| | |
|---|---|
| *G01S 7/48* | (2006.01) |
| *G01S 17/06* | (2006.01) |
| *G02B 26/10* | (2006.01) |
| *G01C 15/00* | (2006.01) |
| *G01S 7/481* | (2006.01) |
| *G01V 8/10* | (2006.01) |

(Continued)

(52) U.S. Cl.
CPC .......... *G01S 7/4802* (2013.01); *G01B 11/105* (2013.01); *G01C 15/002* (2013.01); *G01M 17/027* (2013.01); *G01S 7/4817* (2013.01); *G01S 17/06* (2013.01); *G01V 8/10* (2013.01); *G02B 26/105* (2013.01); *G06K 7/10554* (2013.01)

(58) Field of Classification Search
CPC ...... G01S 7/4802; G01S 7/4817; G01S 17/06; G01M 17/027; G01B 11/105; G06K 7/10554; G01V 8/10; G01C 15/002; G02B 26/105
See application file for complete search history.

(56) References Cited

U.S. PATENT DOCUMENTS

| | | | |
|---|---|---|---|
| 4,097,159 A | 6/1978 | Strandberg | |
| 6,995,762 B1 * | 2/2006 | Pavlidis | G06T 17/00 345/419 |

(Continued)

FOREIGN PATENT DOCUMENTS

| | | |
|---|---|---|
| EP | 0004265 A2 | 10/1979 |
| JP | H02179403 A | 7/1990 |

OTHER PUBLICATIONS

International Search Report and Written Opinion dated Mar. 13, 2019 in International Patent Application No. PCT/US2018/053726, 18 pages.

*Primary Examiner* — David P Porta
*Assistant Examiner* — Meenakshi S Sahu
(74) *Attorney, Agent, or Firm* — Shook, Hardy & Bacon L.L.P.

(57) ABSTRACT

Systems and methods are provided for determining attributes (such as size and location) of target objects (e.g., tires) utilizing photoelectric sensors. At least two photoelectric sensors are positioned at respective angles relative to a direction of transport of a conveyance mechanism such that the light rays emitted therefrom cross the width of the conveyance mechanism and cross one another at an intersection point. Based, at least in part, upon respective interruption times of the light rays by the target object, and a location of the interruption of the light rays relative to the intersection point, one or more attributes of the target object are determined. Systems and methods further are provided for determining a height profile of a target object utilizing at least one photoelectric sensor.

19 Claims, 6 Drawing Sheets

(51) Int. Cl.
*G06K 7/10* (2006.01)
*G01B 11/10* (2006.01)
*G01M 17/02* (2006.01)

(56) References Cited

U.S. PATENT DOCUMENTS

| | | |
|---|---|---|
| 7,326,914 B2 | 2/2008 | Pirkl |
| 7,721,964 B2 | 5/2010 | Reichenbach et al. |
| 2004/0186619 A1* | 9/2004 | Pellerin .................. G01B 11/04 700/230 |

* cited by examiner

DETERMINING OBJECT ATTRIBUTES USING PHOTOELECTRIC SENSORS

BACKGROUND

When scanning cylindrical, symmetrical objects as they are transported by a conveyance mechanism (for instance, when scanning tires for barcodes, size verification, and the like, as the tires are transported by a conveyor belt), it is useful to be aware of object location and size (e.g., diameter) prior to scanning. Such information may be useful, for instance, to define a precise region of interest (ROI) where barcodes may be searched for within a larger image, to direct a steerable mirror camera system to scan only the object of interest and/or one or more ROIs, to reduce processing power that would be required for image stitching if a series of partial images was acquired due to improper camera alignment caused by lack of size and/or location information, and to provide size and location information for verification, logging, and process monitoring.

Three-dimensional scanning instruments, such as the DM3610 Dimensioner provided by Datalogic, are known in the art and may be utilized to locate objects being transported by a conveyance mechanism. Such scanning instruments, however, often are prohibitively expensive and may require complex equipment and assembly.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In various embodiments, systems and methods are provided for determining attributes (e.g., size (diameter and/or height) and location) of target objects (e.g., tires) utilizing photoelectric sensors. In some exemplary embodiments, first and second photoelectric sensors are positioned at respective angles relative to a direction of transport of a conveyance mechanism (e.g., a conveyor belt system) such that light rays emitted from the respective photoelectric sensors cross one another at an intersection point. Based, at least in part, upon respective interruption times and locations of the light rays by the target object, and a time and location of the interruption of the light rays relative to the intersection point, one or more attributes of the target object may be determined. In exemplary embodiments, systems and methods further are provided for determining a height profile of a target object utilizing at least one photoelectric sensor, a parallax laser beam, and a camera array.

Embodiments hereof provide for a simple, low-cost alternative to complex dimensioning systems and permit recognition of regions of interest (ROIs) within a larger image (e.g., regions of a larger image that contain barcodes) during camera acquisition. Embodiments further provide a simple, low-cost alternative, for instance, to direct a steerable mirror camera system to scan only target objects, to reduce processing power required for stitching multiple images, and to provide size and location information for consumer verification, logging, and process monitoring.

BRIEF DESCRIPTION OF THE DRAWINGS

The present invention is illustrated by way of example and not limitation in the accompanying figures in which like reference numerals indicate similar elements and in which.

DETAILED DESCRIPTION

Figure 1:
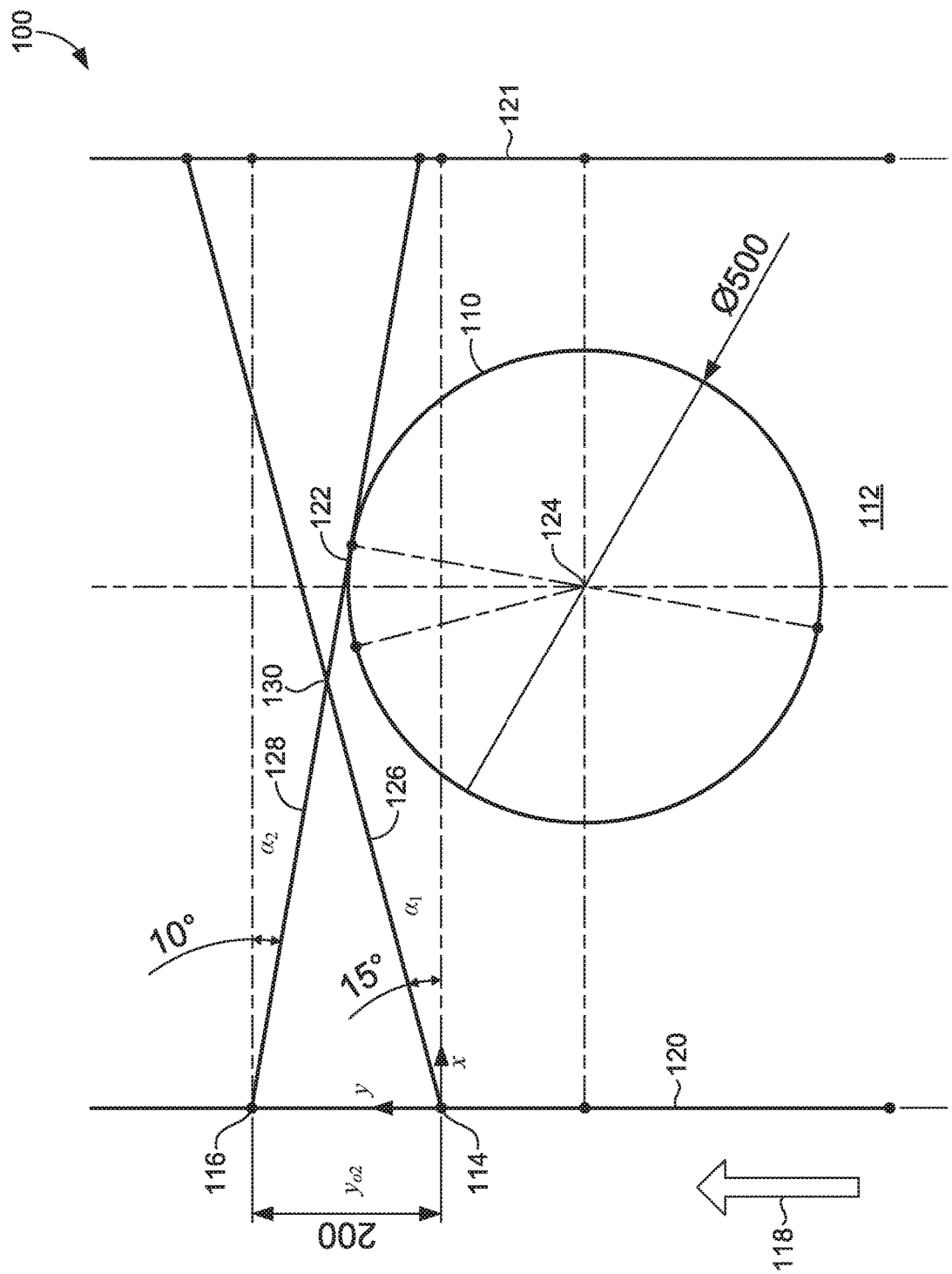
FIG. 1 is a schematic diagram of an exemplary system having a target object (e.g., a tire) that is being transported by a conveyance mechanism (e.g., a conveyor belt), in accordance with embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As previously set forth, when scanning cylindrical, symmetrical objects (for instance, tires) as they are transported by a conveyance mechanism (for instance, a conveyor belt), it is useful to be aware of the location (relative to the conveyance mechanism) and size (e.g., diameter and/or height) of the objects prior to scanning. Such information may be useful, by way of example only, to define a precise region of interest (ROI) where barcodes may be searched for within a larger image, to direct a steerable mirror camera system to scan only the object of interest and/or one or more ROIs, to reduce processing power that would be required for image stitching if a series of partial images was acquired due to improper camera alignment caused by lack of size and/or location information, and to provide size and location information for verification, logging, and process monitoring.

Three-dimensional scanning instruments are known in the art that may be utilized to locate objects being transported by a conveyance mechanism, to determine size (i.e., diameter) of cylindrical, symmetrical objects, and/or to develop a three-dimensional point cloud of an object being transported by a conveyance mechanism. Such scanning instruments, however, often are prohibitively expensive and may require complex equipment and assembly.

Various aspects of the technology described herein are generally directed to lower cost and less complex systems and methods for determining attributes (e.g., size (diameter and/or height) and location (relative to a conveyance system)) of target objects (e.g., tires) utilizing photoelectric sensors. First and second photoelectric sensors are positioned at respective angles relative to a direction of transport of a conveyance mechanism (e.g., a conveyor belt system) such that the light rays emitted from the photoelectric sensors cross one another at an intersection point. As described herein, an "intersection point" may be a single point in the z-dimension (that is, a point in which the first and second light rays share the same x, y, and z coordinates) or may be two different points in the z-dimension (that is, represented by a pair of x,y coordinates that are the same but that each contain a z-coordinate that differs). In this way, photoelectric sensors that emit light rays that are offset in height relative to the conveyance mechanism may still result in light rays having an "intersection point" as the term is contemplated herein. Based, at least in part, upon respective interruption times of the light rays by the target object, and a location of the interruption of the light rays relative to the intersection point, one or more attributes of the target object may be determined.

Accordingly, exemplary embodiments are directed to a system for determining one or more attributes of a target object (e.g., a tire) being transported by a conveyance mechanism (e.g., a conveyor belt), the conveyance mechanism having a traverse measurement (the traverse measurement being, for instance, coincident with the x dimension) and a longitudinal measurement (the longitudinal measurement being, for instance, coincident with the y dimension) and a direction of transport that corresponds to the longitudinal measurement, and the target object having a diameter in a plane substantially parallel to a conveying plane of the conveyance mechanism. The system comprises a first photoelectric sensor that emits a first light ray (e.g., a ray of visible light, an infrared transmission (IR), and/or ultraviolet (UV) energy) and a second photoelectric sensor that emits a second light ray (e.g., a ray of visible light, an infrared transmission (IR), and/or ultraviolet (UV) energy). The first and second photoelectric sensors are positioned at respective angles relative to the direction of transport such that each of the first and second light rays crosses one another at a first intersection point. Based, at least in part, upon a respective time of interruption of each of the first and second light rays by the target object and a location of interruption of each of the first and second light rays by the target object relative to the first intersection point, one or more attributes of the target object are determined. (As utilized herein, the term "substantially" as it modifies a term of direction such as "parallel," "orthogonal," "perpendicular," or the like refers to directions that are in 100% alignment with the term of direction (for instance. "substantially parallel" may refer to something that is, indeed, parallel) as well as to directions that are slightly off of 100% alignment. For instance, in embodiments, "substantially" may refer to directions that are less than or equal to 5° off of 100% alignment in either direction (for instance, "substantially parallel" may refer to something that is 5° or less off of parallel alignment). Any and all such variations, and any combination thereof, are contemplated to be within the scope of embodiments of the present invention.)

Other exemplary embodiments are directed to methods for determining one or more attributes of a target object (e.g., a tire) being transported by a conveyance mechanism (e.g., a conveyor belt), the conveyance mechanism having a traverse measurement (the traverse measurement being, for instance, coincident with the x dimension) and a longitudinal measurement (the longitudinal measurement being, for instance, coincident with they dimension) and a direction of transport that corresponds to the longitudinal measurement, and the target object having a diameter in a plane substantially parallel to a conveying plane of the conveyance mechanism. The method comprises emitting a first light ray (e.g., a ray of visible light, an infrared transmission (IR), and/or ultraviolet (UV) energy) from a first photoelectric sensor and emitting a second light ray (e.g., a ray of visible light, an infrared transmission (IR), and/or ultraviolet (UV) energy) from a second photoelectric sensor. The first and second photoelectric sensors are positioned at respective angles relative to the direction of transport such that the first and second light rays cross one another at a first intersection point. The method further comprises, utilizing the conveyance mechanism, transporting the target object in the direction of transport such that the target object is caused to interrupt the first and second light rays; and determining the one or more attributes based on the respective time of interruption of each of the first and second light rays and a location of interruption of each of the first and second light rays relative to the first intersection point.

Various aspects of the technology described herein further are generally directed to systems and methods for determining a height profile of a target object (e.g., a tire) utilizing at least one photoelectric sensor, a parallax laser beam, and a camera array. Accordingly, additional exemplary embodiments are directed to a system for determining at least one of a position (relative to a conveyance belt) and height profile of a target object (e.g., a tire), the target object having a known diameter. The system comprises a conveyor belt having a traverse measurement (the traverse measurement being, for instance, coincident with the x dimension) and a longitudinal measurement (the longitudinal measurement being, for instance, coincident with the y dimension), the conveyor belt having a direction of transport for transporting the target object that corresponds to the longitudinal measurement. The system further comprises a photoelectric sensor that emits a light ray (e.g., a ray of visible light, an infrared transmission (IR), and/or ultraviolet (UV) energy) in a direction substantially orthogonal to the direction of transport. Still further, the system comprises a parallax laser that emits a parallax laser beam in a plane substantially perpendicular to the conveyor belt and a two-dimensional camera array having a field of view that captures at least one image of the target object and the parallax laser beam when the parallax laser beam is positioned at a center point of the target object.

Still other exemplary embodiments are directed to methods for determining at least one of a position and a height profile of a target object (e.g., a tire), the target object having a known diameter. The method comprises transporting the target object on a conveyor belt, the conveyor belt having a traverse measurement (the traverse measurement being, for instance, coincident with the x dimension) and a longitudinal measurement (the traverse measurement being, for instance, coincident with the y dimension) and having a direction of transport that corresponds to the longitudinal measurement. The method additionally comprises capturing interrupt data from a photoelectric sensor that emits a light ray (e.g., a ray of visible light, an infrared transmission (IR), and/or ultraviolet (UV) energy) in a direction substantially orthogonal to the direction of transport and in a plane substantially parallel to the conveying plane of the conveyor belt, the interrupt data being related to the target object interrupting the light ray while being transported. Still further, the method comprises capturing, utilizing a camera array (e.g., a two-dimensional camera array), at least one image of the target object and a parallax laser beam at a time instance when the parallax laser beam is positioned at a center point of the target object, the parallax laser beam being positioned in a plane substantially perpendicular to the conveyor belt. Additionally, the method comprises utilizing the interrupt data from the photoelectric sensor and the at least one image to determine at least one of the position (relative to the conveyor belt) and the height profile of the target object.

Figure 3:
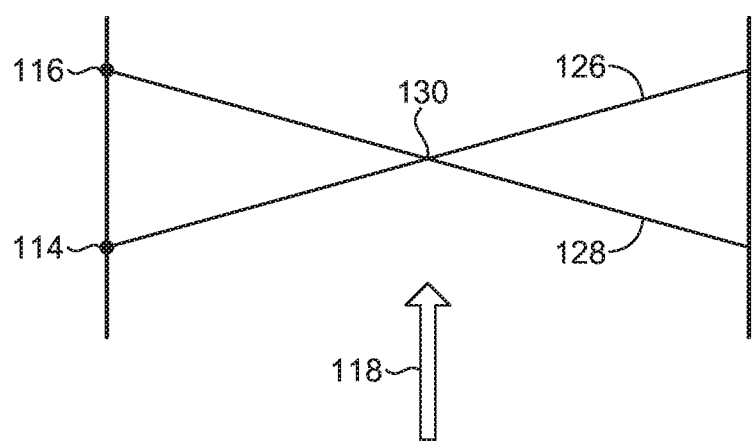
FIG. 3 is a schematic diagram showing an exemplary configuration of two crossed light rays respectively emitted from two symmetrically positioned and angled photoelectric sensors, in accordance with embodiments of the present invention.

Turning now to FIG. 1, a schematic diagram 100 is illustrated showing a top view of an exemplary target object 110 (e.g., a tire) being transported by a conveyance mechanism 112 (e.g., a conveyor belt) in accordance with embodiments of the present invention. Driving machinery for the conveyance mechanism 112 may be of any conventional type known to those having ordinary skill in the art and thus such machinery is not illustrated nor further described herein. First and second photoelectric sensors 114, 116 are mounted at respective angles $\alpha_1$ and $\alpha_2$ relative to the direction of transport 118, with offsets along the direction of transport 118 of $y_{o1}$ (not shown) and $y_{o2}$. Note that the sign of the angles $\alpha_1$, $\alpha_2$ is significant. In the example of FIG. 1, $\alpha_1=+15°$ and $\alpha_2=-10°$. As shown, the origin is coincident with the first photoelectric sensor 114 and a first edge 120 of the conveyance mechanism 112. Accordingly, $y_{o1}=0$. The resolution (i.e., accuracy of measurement) of locating the center of the target object 110 increases as the first and second photoelectric sensors 114, 116 are positioned in a less parallel orientation with respect to one another. Increased resolution is a tradeoff for using more space on the conveyance mechanism 112. In embodiments, an optimum configuration for maximum resolution and minimum space utilized on the conveyance mechanism 112 may be to use equal but opposite angles such that light rays 126, 128 emitted from the photoelectric sensors 114, 116 have an intersection point 130 located at the center of the traverse measurement of the conveyance mechanism (i.e., an X configuration). Such a configuration is illustrated in FIG. 3, more fully described below.

Figure 2:
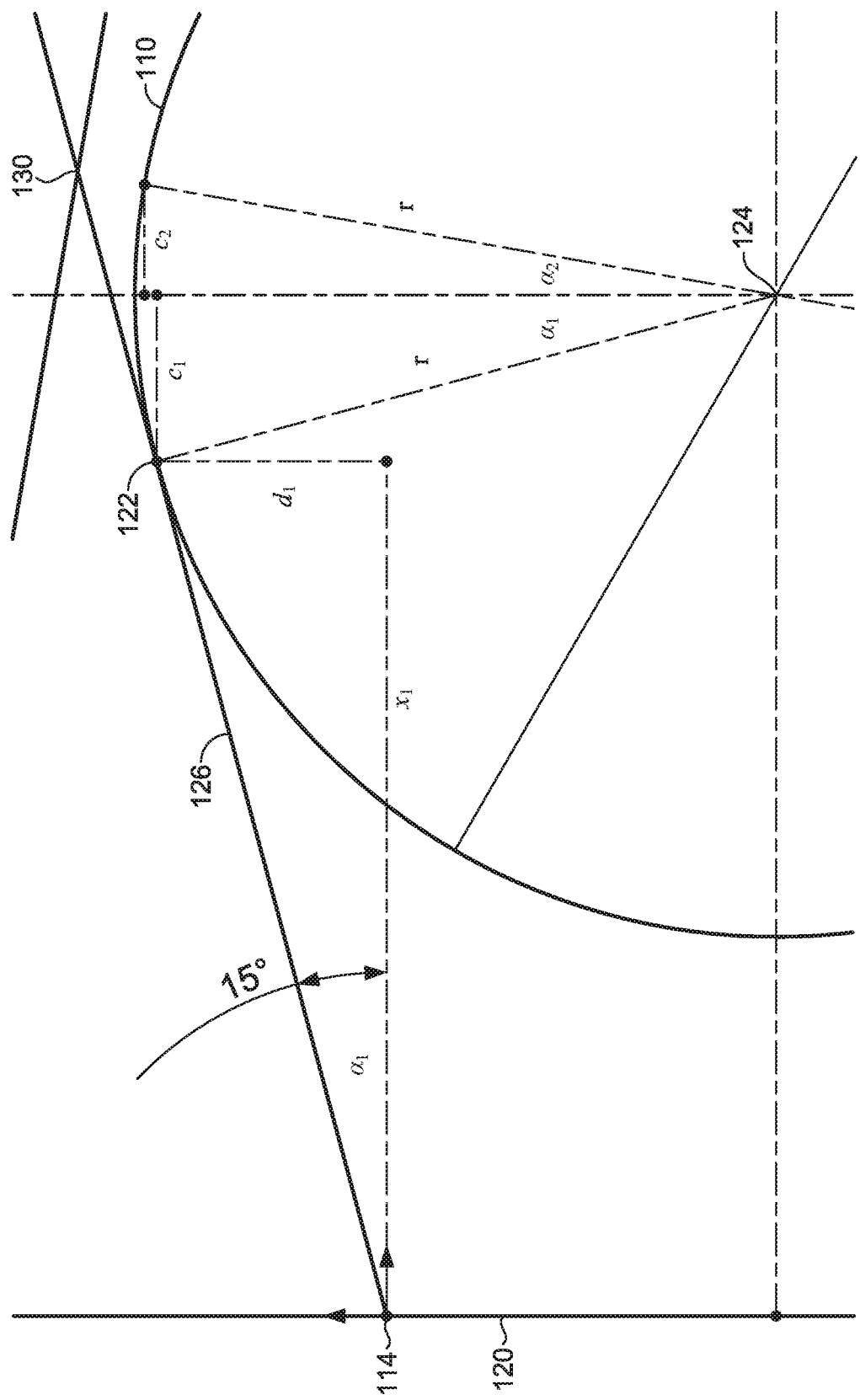
FIG. 2 is a schematic diagram of an exemplary system portion showing a target object (e.g., a tire) that is being transported by a conveyance mechanism (e.g., a conveyor belt) in accordance with embodiments of the present invention.

To determine the desired measurements, let s=speed at which the conveyance mechanism 112 moves (transports the target object 110). Let $d_n$=the distance in the direction of transport between a sensor, sensor n (e.g., the first photoelectric sensor 114 or the second photoelectric sensor 116), and the intersection point of the target object 110 and the sensor n (e.g., intersection point 122 of the target object 110 and the first photoelectric sensor 114). Let $x_n$ be the horizontal distance (along the traverse measurement) from the first edge 120 of the conveyance mechanism 112 to the target object intersection point 122. (FIG. 2 is a schematic diagram illustrating a more detailed view of the arrangement of variables.) Accordingly, $$d_n = x_n \tan \alpha_n. \tag{Equation 1}$$

Let $y_n$=the distance in the direction of transport 118 between the origin and the intersection point 122 of the target object 110 and sensor n. Thus, $$y_n = d_n + y_{on}. \tag{Equation 2}$$

Let $y_{cn}=r \cos \alpha_n$ be the distance along the direction of transport 118 from the center 124 of the target object 110 to the intersection point 122 of the target object 110 and the light ray emitted from the photoelectric sensor (sensor n). The difference between the two is:

$$\Delta y_c = y_{c2} - y_{c1} = r(\cos \alpha_2 - \cos \alpha_1). \tag{Equation 3}$$

Let $\Delta y_{m,n}$ be the distance in the direction of transport between photoelectric sensor m and photoelectric sensor n. As such, $$\Delta y_{2,1} = y_2 - y_1 \cdot \Delta y_c. \tag{Equation 4}$$

When only two photoelectric sensors are considered (as in the example illustrated in FIGS. 1 and 2), $\Delta y_{2,1}$ in Equation 4 may be shortened to:

$$\Delta y. \tag{Equation 5}$$

Note $\Delta y$ can be negative.

Let $t_n$=the absolute time that sensor n is blocked by the leading edge of the target object 110. The difference in time between the photoelectric sensor trip points is:

$$t_2 - t_1. \tag{Equation 6}$$

Equation 6 can have a negative value.

The relationship between the speed of transport of the conveyance mechanism and the distance between photoelectric sensor interrupts is:

$$\Delta y = s(t_2 - t_1). \tag{Equation 7}$$

From which follows:

$$d_2 - d_1 = s(t_2 - t_1) - y_{o2} + \Delta y_c. \tag{Equation 8}$$

Let $x_c$, $y_c$ be the center point of the target object 110 relative to the origin. Let r be the radius of the target object 110. Let $c_n = x_c - x_n$ and $c = c_1 - c_2$. (See FIG. 2.) Note that in this example $c_2$ and $\alpha_2$ are negative values.

As a result, it may be determined that:

$$c_n r \sin \alpha_n. \tag{Equation 9}$$

$$c = r(\sin \alpha_1 - \sin \alpha_2). \tag{Equation 10}$$

From these calculations, it may be determined that:

$$d_2 - d_1 = x_2 \tan \alpha_2 - x_1 \tan \alpha_1 \tag{Equation 11}$$

and $$c = x_2 - x_1. \tag{Equation 12}$$

$$x_2 = x_1 + c. \tag{Equation 13}$$

Therefore, $$d_2 - d_1 = (x_1 + c) \tan \alpha_2 - x_1 \tan \alpha_1. \tag{Equation 14}$$

Solving for $x_1$, it can be determined that:

$$x_1 = d_2 - d_1 - c \tan \alpha_2 / \tan \alpha_2 - \tan \alpha_1. \tag{Equation 15}$$

The center of the target object 110, $x_c$, is located at:

$$x_c = c_1 + x_1. \tag{Equation 16}$$

As a result:

$$x_c = r \sin \alpha_1 + s(t_2 - t_1) - y_{o2} + r(\cos \alpha_2 - \cos \alpha_1) - r(\sin \alpha_1 - \sin \alpha_2) \tan \alpha_2 / \tan \alpha_2 - \tan \alpha_1. \tag{Equation 17}$$

In the general case where the two angles are not equal, in order to find the center 124 of the target object 110, the radius must be known. If the speed at which the conveyance mechanism transports the target object 110 is known, the radius can be determined using the trailing edge of the target object 110 as it leaves a photoelectric sensor. Let $tt_n$=the absolute time that the target object 110 exits the trailing edge of photoelectric sensor n. The duration the sensor n is active is:

$$t_n - tt_n. \qquad \text{(Equation 18)}$$

The radius of the target object 110 is given by:

$$r = s/2(t_n - tt_n)\cos \alpha_n. \qquad \text{(Equation 19)}$$

There are a few special cases to consider. The first is when the light rays emitted by the first photoelectric sensor 114 and the second photoelectric sensor 116 are parallel to one another ($\alpha_1 = \alpha_2$). This is a degenerate case and the target object 110 location is indeterminate. However the parallel case can be used to find the belt speed independent of radius and position of the target object 110.

The second special case occurs when the magnitude of the two angles are equal but opposite in sign. In this case the radius term drops out and the equation simplifies to:

$$x_c = y_{02} - s(t_2 - t_1)/2 \tan \alpha. \qquad \text{(Equation 20)}$$

If the speed at which the conveyance mechanism transports the target object 110 is known, either because it is fixed or if there is an encoder, the simplest configuration is a pair of crossed photoelectric sensors 114, 116 with equal but opposite crossing angles. The configuration that uses conveyor space the most efficiently occurs when the light rays 126, 128 emitted by the sensors 114, 116 have an intersection point 130 at the center (see the configuration illustrated in the schematic diagram of FIG. 3). The simplified equation (equation 20) may be utilized to find the position of the target object.

Figure 4:
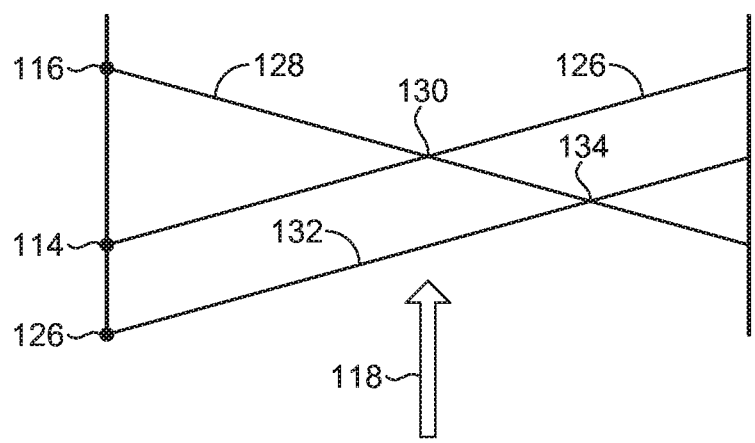
FIG. 4 is a schematic diagram showing an exemplary configuration of three crossed light rays respectively emitted from three photoelectric sensors positioned at angles of equivalent magnitude, in accordance with embodiments of the present invention.

If the speed at which the conveyance mechanism 112 transports the target object 110 is not known, but assumed constant, a third photoelectric sensor 126 may be utilized to measure the speed and then calculate the radius of the target object 110. In this instance, a third light ray 132 emitted from the third photoelectric sensor 126 is positioned such that it is substantially parallel to either of the first or second light rays 126 or 128. The transport speed may be determined by dividing the distance between the two substantially parallel photoelectric sensors 114 and 116 by the difference in time between the sensor trip points (that is, the point at which the target object 110 intersects the light ray 126, 128 emitted by its respective sensor 114,116). Having first calculated the speed, the simplified equation (equation 20) may then be used to find the location of the target object 110 relative to the conveyance mechanism 112. This configuration is illustrated in the schematic diagram of FIG. 4.

Figure 5:
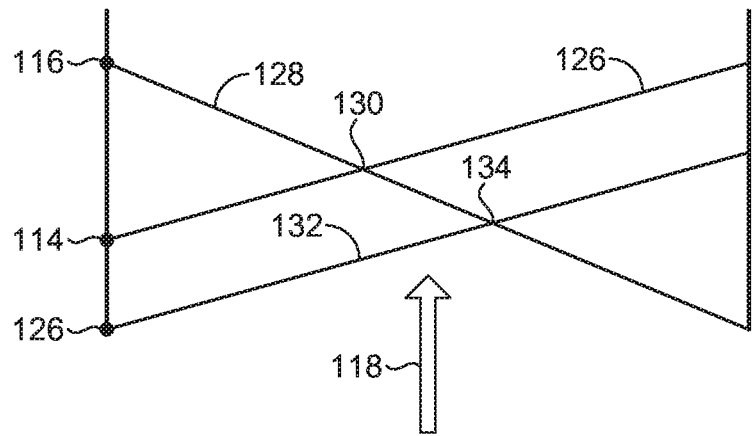
FIG. 5 is a schematic diagram showing an exemplary configuration of three crossed light rays respectively emitted from three photoelectric sensors positioned at angles of unequal magnitude, in accordance with embodiments of the present invention.

The configuration illustrated in FIG. 5 gives improved resolution in finding the center of the target object 110 without taking up any additional space on the conveyance mechanism 112. The angle of the crossing light rays 126, 128 from the photoelectric sensors 114, 116 is increased as shown while light rays 126, 132 remain substantially parallel. As in FIG. 4, the transport speed is determined using the parallel light rays 126, 132 and the target object position is found using non-parallel light rays 126, 128. Because the angles between light rays 126 and 128 are not equal in magnitude, the radius of the target object 110 may be determined and the center of the target object 110 may be determined utilizing the more complex equation (Equation 17).

As previously set forth, various aspects of the technology described herein further relate to systems and methods for determining a height profile of a target object 110 (e.g., a tire) utilizing at least one photoelectric sensor, a parallax laser beam, and a camera array. A system 600 illustrating this embodiment is shown in the schematic diagram of FIG. 6.

If the speed at which the conveyance mechanism 610 transports the target object 612 and the diameter of the object 612 are known, a single image acquisition of a parallax laser beam 614 may be utilized to determine the position and height profile of the target object 612. Because the target object 612 is round and symmetrical, this information may be utilized to extrapolate a complete three-dimensional model for the object 612. Such information may provide a useful visualization. For example, image segments from the two-dimensional camera array 616 may be mapped to a single three-dimensional point cloud of the target object 612 and presented, for instance, in a graphical user interface (not shown). Note that this embodiment does not require the use of crossed light rays from two (or even three) photoelectric sensors. Rather, a single photoelectric sensor 618 positioned orthogonal to the direction of transport of the conveyance mechanism will suffice if the speed of transport is known or, if the speed of transport is not known, a pair of parallel photoelectric sensors 618, 620 may be utilized to determine such speed.

Figure 6:
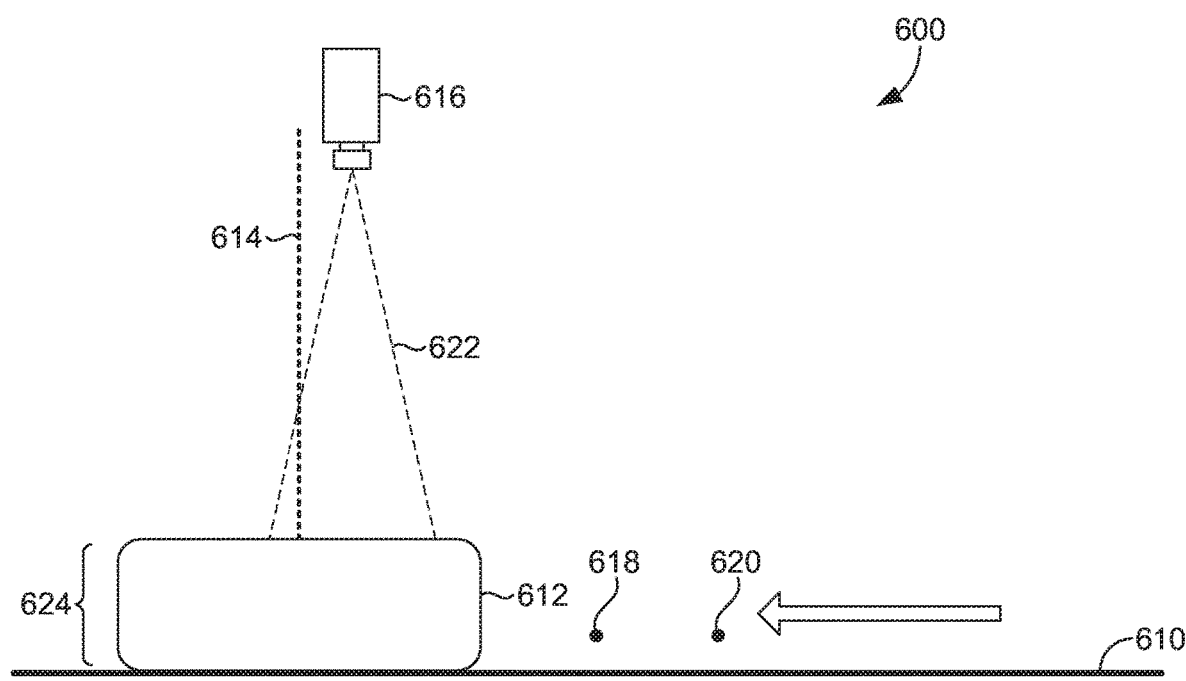
FIG. 6 is a schematic diagram showing a system for determining a height profile of an object utilizing at least one photoelectric sensor, a camera array and a parallax laser beam, in accordance with embodiments of the present invention.

FIG. 6 illustrates a side view of a camera array 616 with a parallax laser beam 614. Note that the laser beam plane is perpendicular to the conveyance mechanism 610. First, the conveyance mechanism speed and diameter of the target object 612 are determined from the photoelectric sensor(s) 618, 620. The camera array 616 then begins capturing images when the target object 612 comes into its field of view 622. When the target object 612 is centered on the laser beam 614, the standard illuminator shuts off and the camera 616 takes an image of the laser beam 614. The centroid of the laser beam 614 is found in the image and the y coordinate of the laser beam 614 is used to calculate the height profile 624 and position of the target object 612 on the conveyance mechanism 610. The complete three-dimensional profile of the target object 612 then may be extrapolated by rotating the planar profile about the center of the target object 612.

An alternative embodiment utilizes a dedicated camera to find the height profile instead of using the two-dimensional camera array shown in FIG. 6. This embodiment requires an additional camera. The advantage is that this camera can use a wider angle lens to ensure the entire target object is captured in a single image. It also frees the camera array from the complexity of doing both decoding (e.g., barcode reading) and height profiling.

Figure 7:
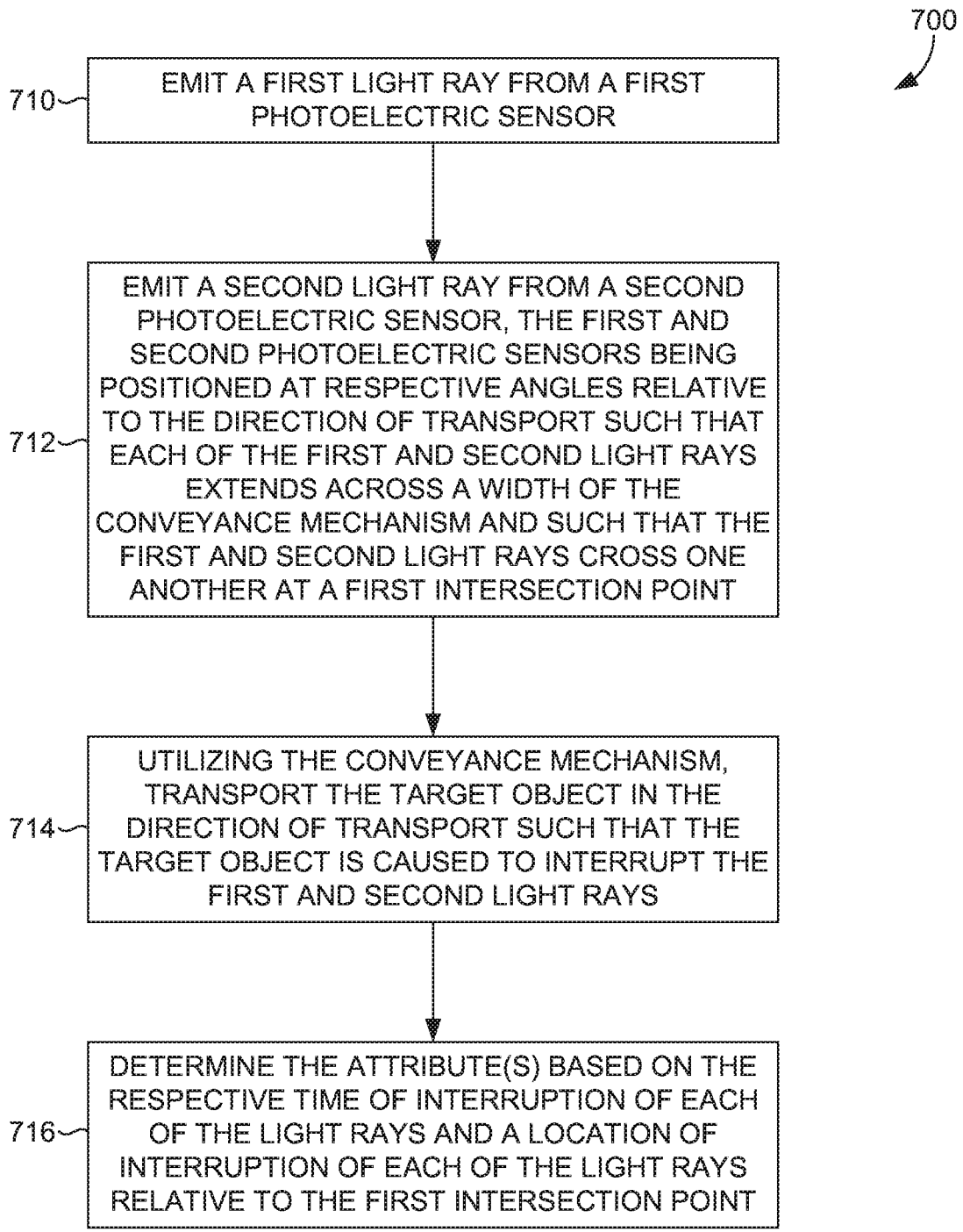
FIG. 7 is a flow diagram illustrating a method for determining one or more attributes of an object that is being transported by a conveyance mechanism, in accordance with embodiments of the present invention.

With reference now to FIG. 7, a flow diagram is illustrated showing a method 700 for determining one or more attributes of a target object being transported by a conveyance mechanism (e.g., a conveyor belt), in accordance with embodiments of the present invention. In exemplary embodiments, the target object is cylindrical and symmetrical and may be, for instance, a tire. The conveyance mechanism includes a traverse measurement and a longitudinal measurement and a direction of transport (that is, a direction in which target objects being transported thereby are to be moved) that corresponds to the longitudinal measurement. The target object has a diameter in a plane substantially parallel to a conveying plane of the conveyance mechanism.

As indicated at block 710, a first light ray (e.g., a ray of visible light, an infrared transmission (IR), and/or ultraviolet (UV) energy) is emitted from a first photoelectric sensor. As indicated at block 712, a second light ray (e.g., a ray of visible light, an infrared transmission (IR), and/or ultraviolet (UV) energy) is emitted from a second photoelectric sensor. The first and second photoelectric sensors are positioned at respective angles relative to the direction of transport such that each of the first and second light rays extends across a width of the conveyance mechanism (the width being represented by an any point coincident with the first edge 120 of the conveyance mechanism 112 of FIG. 1, for instance, to any point coincident with the second edge 121 of the conveyance mechanism 112) and such that the first and second light rays cross one another at a first intersection point.

As indicated at block 714, utilizing the conveyance mechanism, the target object is transported in the direction of transport such that the target object is caused to interrupt the first and second light rays. As indicated at block 716, one or more attributes are determined based on the respective time of interruption of each of the first and second light rays (that is, the absolute and/or relative time the target object interrupts the respective light rays as it is transported by the conveyance mechanism) and a location of interruption of each of the first and second light rays relative to the first intersection point.

Figure 8:
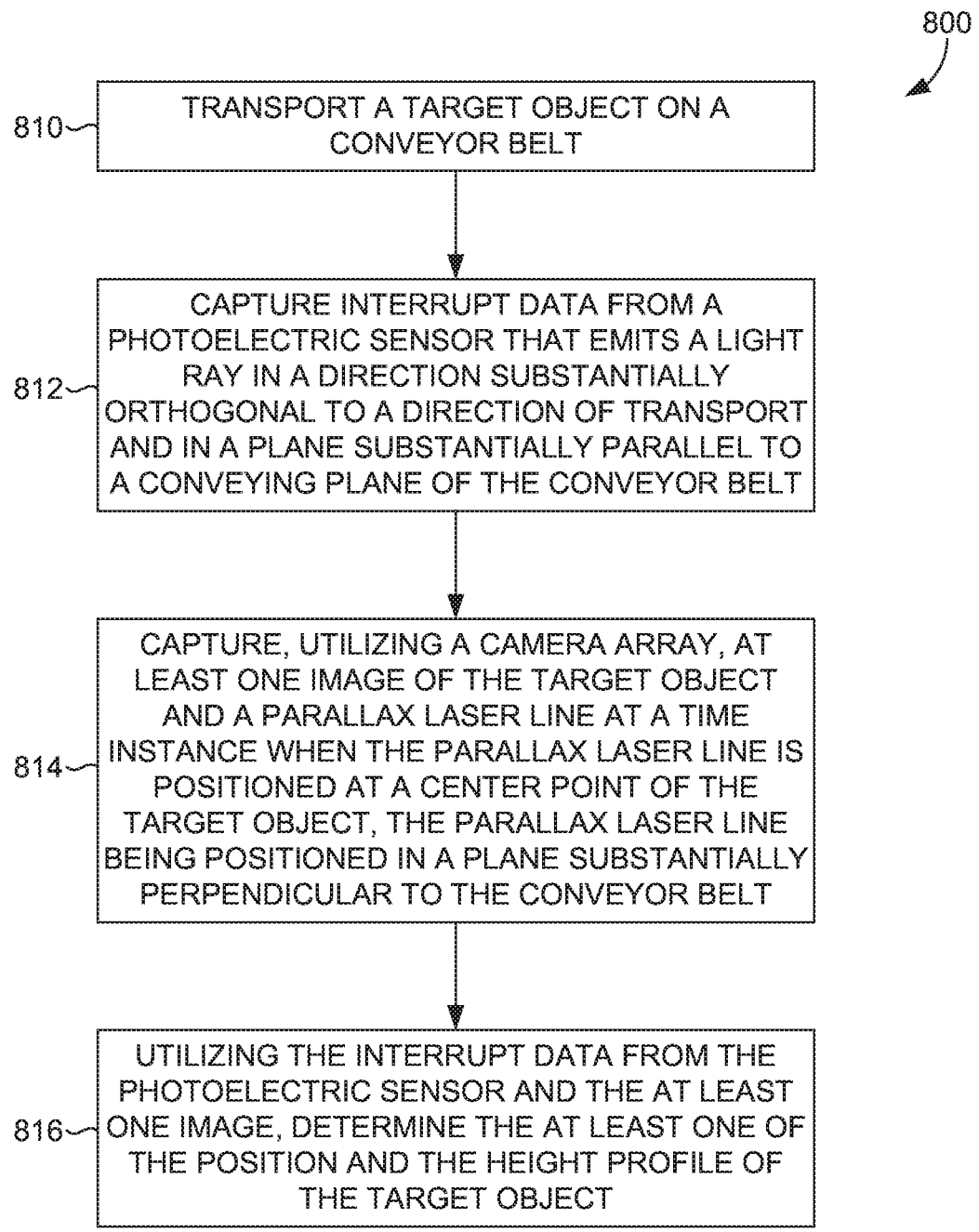
FIG. 8 is a flow diagram illustrating a method for determining position and/or height of a target object having a known diameter, in accordance with embodiments of the present invention.

Turning now to FIG. 8, a flow diagram is illustrated showing a method 800 for determining position and/or height of a target object (e.g., a tire) having a known diameter, in accordance with embodiments of the present invention. As indicated at block 810, the target object is transported by a conveyor belt, the conveyor belt having a traverse measurement and a longitudinal measurement. A direction of transport of the conveyor belt corresponds to the longitudinal measurement. As indicated at block 812, interrupt data is captured from a photoelectric sensor that emits a light ray (e.g., a ray of visible light, an infrared transmission (IR), and/or ultraviolet (UV) energy) in a direction substantially orthogonal to the direction of transport and in a plane substantially parallel to the conveying plane of the conveyor belt. The interrupt data is related to the target object interrupting the light ray while being transported.

As indicated at block 814, utilizing a camera array (e.g., a two-dimensional camera array), at least one image of the target object and a parallax laser beam is captured at a time instance when the parallax laser beam is positioned at a center point of the target object, the parallax laser beam being positioned in a plane substantially perpendicular to the conveyor belt. As indicated at block 816, utilizing the interrupt data from the photoelectric sensor and the at least one image, at least one of the position and the height profile of the target object is determined.

Exemplary Features Having Multiple Dependencies:

As used herein and in connection with the features listed hereinafter, the terminology "any of features" or similar variations of said terminology is intended to be interpreted such that features may be combined in any combination. For example, an exemplary feature 4 may indicate the method/computer-readable storage medium of any of features 1 through 3, which is intended to be interpreted such that elements of feature 1 and feature 4 may be combined, elements of feature 2 and feature 4 may be combined, elements of feature 3 and feature 4 may be combined, elements of features 1, 2, and 4 may be combined, elements of features 2, 3, and 4 may be combined, elements of features 1, 2, 3, and 4 may be combined, and/or other variations. Further, the terminology "any of features" or similar variations of said terminology is intended to include "any one of features" or other variations of such terminology, as indicated by some of the examples provided above.

Feature 1:

A system for determining one or more attributes of a target object (e.g., a tire) being transported by a conveyance mechanism (e.g., a conveyor belt), the conveyance mechanism having a traverse measurement and a longitudinal measurement and a direction of transport that corresponds to the longitudinal measurement, and the target object having a diameter in a plane substantially parallel to a conveying plane of the conveyance mechanism, the system comprising: a first photoelectric sensor that emits a first light ray (e.g., a ray of visible light, an infrared transmission (IR), and/or ultraviolet (UV) energy); and a second photoelectric sensor that emits a second light ray (e.g., a ray of visible light, an infrared transmission (IR), and/or ultraviolet (UV) energy), the first and second photoelectric sensors being positioned at respective angles relative to the direction of transport such that each of the first and second light rays extends across a width of the conveyance mechanism and such that the first and second light rays cross one another at a first intersection point, wherein based, at least in part, upon a respective time of interruption of each of the first and second light rays by the target object and a location of interruption of each of the first and second light rays by the target object relative to the first intersection point, the one or more attributes of the target object are determined.

Feature 2:

The system of feature 1, wherein the one or more attributes comprises a location of the target object relative to one or more of the conveyance mechanism, the first photoelectric sensor, and the second photoelectric sensor.

Feature 3:

The system of any of features 1 and 2, wherein the respective angles relative to the direction of transport at which the first and second photoelectric sensors are positioned are equal but opposite such that the first intersection point corresponds to a point coincident with a center point of the traverse measurement of the conveyance mechanism.

Feature 4:

The system of feature 1, wherein a speed at which the conveyance mechanism transports the target object is known, and wherein the one or more attributes comprises a diameter of the target object.

Feature 5:

The system of feature 1, further comprising a third photoelectric sensor that emits a third light ray, the third light ray extending across the width of the conveyance mechanism and crossing at least one of the first light ray and the second light ray at a second intersection point.

Feature 6:

The system of feature 5, wherein a speed at which the conveyance mechanism transports the target object is unknown but constant, and wherein the one or more attributes comprises the speed at which the conveyance mechanism transports the target object.

Feature 7:

A method for determining one or more attributes of a target object (e.g., a tire) being transported by a conveyance mechanism (e.g., a conveyor belt), the conveyance mechanism having a traverse measurement and a longitudinal measurement and a direction of transport that corresponds to the longitudinal measurement, and the target object having a diameter in a plane substantially parallel to a conveying plane of the conveyance mechanism, the method comprising: emitting a first light ray (e.g., a ray of visible light, an infrared transmission (IR), and/or ultraviolet (UV) energy) from a first photoelectric sensor; emitting a second light ray (e.g., a ray of visible light, an infrared transmission (IR), and/or ultraviolet (UV) energy) from a second photoelectric sensor, the first and second photoelectric sensors being positioned at respective angles relative to the direction of transport such that each of the first and second light rays extends across a width of the conveyance mechanism and such that the first and second light rays cross one another at a first intersection point; utilizing the conveyance mechanism, transporting the target object in the direction of transport such that the target object is caused to interrupt the first and second light rays; and determining the one or more attributes based on the respective time of interruption of each of the first and second light rays and a location of interruption of each of the first and second light rays relative to the first intersection point.

Feature 8:

The method of feature 7, wherein the one or more attributes comprise a location of the target object relative to one or more of the conveyance mechanism, the first photoelectric sensor, and the second photoelectric sensor.

Feature 9:

The method of any of features 7 and 8, wherein the respective angles relative to the direction of transport at which the first and second photoelectric sensors are positioned are equal but opposite such that the first intersection point corresponds to a point coincident with a center point of the traverse measurement of the conveyance mechanism.

Feature 10:

The method of feature 7, wherein a speed at which the conveyance mechanism transports the target object is known, and wherein the one or more attributes comprises a diameter of the target object.

Feature 11:

The method of feature 7, further comprising emitting a third light ray from a third photoelectric sensor such that the third light ray extends across the width of the conveyance mechanism and crosses at least one of the first light ray and the second light ray at a second intersection point.

Feature 12:

The method of feature 11, wherein a speed at which the conveyance mechanism transports the target object is unknown but constant, and wherein the one or more attributes comprises the speed at which the conveyance mechanism transports the target object.

Feature 13:

A system for determining at least one of a position and height profile of a target object (e.g., a tire), the target object having a known diameter, the system comprising: a conveyor belt having a traverse measurement and a longitudinal measurement, the conveyor belt having a direction of transport for transporting the target object that corresponds to the longitudinal measurement; a photoelectric sensor that emits a light ray (e.g., a ray of visible light, an infrared transmission (IR), and/or ultraviolet (UV) energy) in a direction substantially orthogonal to the direction of transport; a parallax laser that emits a parallax laser beam in a plane substantially perpendicular to the conveyor belt; and a two-dimensional camera array having a field of view that captures at least one image of the target object and the parallax laser beam when the parallax laser beam is positioned at a center point of the target object.

Feature 14:

A method for determining at least one of a position and a height profile of a target object (e.g., a tire), the target object having a known diameter, the method comprising: transporting the target object by a conveyor belt, the conveyor belt having a traverse measurement and a longitudinal measurement and having a direction of transport that corresponds to the longitudinal measurement; capturing interrupt data from a photoelectric sensor that emits a light ray (e.g., a ray of visible light, an infrared transmission (IR), and/or ultraviolet (UV) energy) in a direction substantially orthogonal to the direction of transport and in a plane substantially parallel to the conveying plane of the conveyor belt, the interrupt data being related to the target object interrupting the light ray while being transported; capturing, utilizing a camera array, at least one image of the target object and a parallax laser beam at a time instance when the parallax laser beam is positioned at a center point of the target object, the parallax laser beam being positioned in a plane substantially perpendicular to the conveyor belt; and utilizing the interrupt data from the photoelectric sensor and the at least one image to determine the at least one of the position and the height profile of the target object.

Feature 15:

The method of feature 14, further comprising mapping the at least one image to a three-dimensional point cloud of the target object.

Feature 16:

The method of any of features 14 and 15, further comprising capturing additional interrupt data from an additional photoelectric sensor that emits an additional light ray in the direction substantially orthogonal to the direction of transport and parallel to the light ray emitted from the photoelectric sensor, wherein the interrupt data is related to the target object interrupting both the light ray and the additional light ray while being transported, and wherein the interrupt data from the photoelectric sensor, the interrupt data from the additional photoelectric sensor and the at least one image is utilized to determine the at least one of the position and the height profile of the target object.

As can be understood, embodiments of the present invention provide systems and methods for, among other things, determining attributes (such as size and location) of target objects (e.g., tires) utilizing photoelectric sensors. Aspects hereof have been described in relation to particular embodiments, which are intended in all respects to be illustrative rather than restrictive. Alternative embodiments will become apparent to those of ordinary skill in the art to which aspects of the present invention pertain without departing from its scope.

While aspects hereof are susceptible to various modifications and alternative constructions, certain illustrated embodiments are shown in the drawings and have been described above in detail. It should be understood, however, that there is no intention to limit aspects hereof to the specific forms disclosed, but on the contrary, the intention is to cover all modifications, alternative constructions, and equivalents falling within the spirit and scope of aspects of the invention.

What is claimed is:

1. A system for determining one or more attributes of a target object being transported by a conveyance mechanism, the conveyance mechanism having a traverse measurement and a longitudinal measurement and a direction of transport that corresponds to the longitudinal measurement, and the target object having a diameter in a plane substantially parallel to a conveying plane of the conveyance mechanism, the system comprising:

a first photoelectric sensor that emits a first light ray; and a second photoelectric sensor that emits a second light ray, the first and second photoelectric sensors being positioned at respective angles relative to the direction of transport such that each of the first and second light rays extends across a same width of the conveyance mechanism and such that the first and second light rays cross one another at a first intersection point, wherein based, at least in part, upon a respective time of interruption of each of the first and second light rays by the target object and a location of interruption of each of the first and second light rays by the target object relative to the first intersection point, the one or more attributes of the target object are determined.

2. The system of claim 1, wherein the one or more attributes comprise a location of the target object relative to one or more of the conveyance mechanism, the first photoelectric sensor, and the second photoelectric sensor.

3. The system of claim 1, wherein the respective angles relative to the direction of transport at which the first and second photoelectric sensors are positioned are equal but opposite such that the first intersection point corresponds to a point coincident with a center point of the traverse measurement of the conveyance mechanism.

4. The system of claim 1, wherein a speed at which the conveyance mechanism transports the target object is known, and wherein the one or more attributes comprises a diameter of the target object.

5. The system of claim 1, further comprising a third photoelectric sensor that emits a third light ray, the third light ray extending across the same width of the conveyance mechanism and crossing one of the first light ray or the second light ray at a second intersection point.

6. The system of claim 5, wherein a speed at which the conveyance mechanism transports the target object is unknown but constant, and wherein the one or more attributes comprises the speed at which the conveyance mechanism transports the target object that is determined based on sensor trip points for the target object with the third light ray and the other of the first light ray or the second light ray that it does not intersect with at the second intersection point.

7. A method being for determining one or more attributes of a target object being transported by a conveyance mechanism, the conveyance mechanism having a traverse measurement and a longitudinal measurement and a direction of transport that corresponds to the longitudinal measurement, and the target object having a diameter in a plane substantially parallel to a conveying plane of the conveyance mechanism, the method comprising:
  emitting a first light ray from a first photoelectric sensor;
  emitting a second light ray from a second photoelectric sensor, the first and second photoelectric sensors being positioned at respective angles relative to the direction of transport such that each of the first and second light rays extends across a same width of the conveyance mechanism and such that the first and second light rays cross one another at a first intersection point;
  utilizing the conveyance mechanism, transporting the target object in the direction of transport such that the target object is caused to interrupt the first and second light rays; and
  determining the one or more attributes based on the respective time of interruption of each of the first and second light rays and a location of interruption of each of the first and second light rays relative to the first intersection point.

8. The method of claim 7, wherein the one or more attributes comprises a location of the target object relative to one or more of the conveyance mechanism, the first photoelectric sensor, and the second photoelectric sensor.

9. The method of claim 7, wherein the respective angles relative to the direction of transport at which the first and second photoelectric sensors are positioned are equal but opposite such that the first intersection point corresponds to a point coincident with a center point of the traverse measurement of the conveyance mechanism.

10. The method of claim 7, wherein a speed at which the conveyance mechanism transports the target object is known, and wherein the one or more attributes comprises a diameter of the target object.

11. The method of claim 7, further comprising emitting a third light ray from a third photoelectric sensor such that the third light ray extends across the same width of the conveyance mechanism and crosses one of the first light ray or the second light ray at a second intersection point.

12. The method of claim 11, wherein a speed at which the conveyance mechanism transports the target object is unknown but constant, and wherein the one or more attributes comprises the speed at which the conveyance mechanism transports the target object that is determined based on sensor trip points for the target object with the third light ray and the other of the first light ray or the second light ray that it does not intersect with at the second intersection point.

13. The method of claim 7, further comprising defining a region of interest (ROI) based on the one or more determined attributes, and searching for a barcode within the region of interest for decoding.

14. The method of claim 13, wherein searching for the barcode includes directing a steerable mirror camera system to scan an area based on the defined region of interest.

15. The system of claim 1, wherein each of the first light right and the second light ray are selected from the group consisting of visible light, an infrared transmission, and ultraviolet energy.

16. The system of claim 5, wherein the third light ray extends across the width of the conveyance mechanism at least substantially parallel with the other one of the first light ray or the second light ray that it does not intersect with at the second intersection point.

17. The system of claim 1, wherein the first and second photoelectric sensors are positioned on a same side of the conveyance mechanism.

18. The system of claim 1, wherein the first and second photoelectric is positioned with their respective angles such that the first intersection point is at a center of a transverse measurement of the conveyance measurement.

19. The system of claim 1, wherein the respective angles of the first and second photoelectric sensors being are different values.

* * * * *